United States Patent
Lapointe et al.

(10) Patent No.: US 9,880,355 B2
(45) Date of Patent: Jan. 30, 2018

(54) SPATIALLY MODULATED CLADDING MODE STRIPPER AND OPTICAL FIBER THEREWITH

(71) Applicant: CORACTIVE HIGH-TECH INC., Quebec, Quebec (CA)

(72) Inventors: Marc-André Lapointe, Quebec (CA); Serge Doucet, Quebec (CA); Jean-Noel Maran, Saint Gabriel de Valcartier (CA)

(73) Assignee: CORACTIVE HIGH-TECH INC., Quebec (CA)

(*) Notice: Subject to any disclaimer, the term of this patent is extended or adjusted under 35 U.S.C. 154(b) by 0 days.

(21) Appl. No.: 14/910,864

(22) PCT Filed: Aug. 7, 2013

(86) PCT No.: PCT/CA2013/000704
§ 371 (c)(1),
(2) Date: Feb. 8, 2016

(87) PCT Pub. No.: WO2015/017909
PCT Pub. Date: Feb. 12, 2015

(65) Prior Publication Data
US 2016/0202419 A1    Jul. 14, 2016

(51) Int. Cl.
*G02B 6/42* (2006.01)
*G02B 6/28* (2006.01)
(Continued)

(52) U.S. Cl.
CPC ............. *G02B 6/2852* (2013.01); *G02B 6/14* (2013.01); *G02B 6/036* (2013.01)

(58) Field of Classification Search
CPC ....................................................... G02B 6/14
See application file for complete search history.

(56) References Cited

U.S. PATENT DOCUMENTS 6,301,418 B1    10/2001    Freier et al.
7,349,596 B2    3/2008    Anderegg et al.
(Continued)

FOREIGN PATENT DOCUMENTS

JP    H04-331901 A    11/1992
JP    2008-268747 A    11/2008
(Continued)

OTHER PUBLICATIONS

Wang et al., "Method for stripping cladding light in the High power fiber laser", Optics Communications, 2013, pp. 187-191, vol. 287.
(Continued)

*Primary Examiner* — Sung Pak
*Assistant Examiner* — Hoang Tran
(74) *Attorney, Agent, or Firm* — Buchanan Ingersoll & Rooney PC

(57) ABSTRACT

The present relates to a spatially modulated cladding mode stripper and to an optical fiber comprising a spatially modulated cladding mode stripper. The spatially modulated cladding mode stripper comprises a series of alternating high cladding light extracting regions and low cladding light extracting regions located along a portion of a cladding to modulate extracting of cladding light therefrom.

13 Claims, 9 Drawing Sheets

(51) Int. Cl.
*G02B 6/14* (2006.01)
*G02B 6/036* (2006.01)

(56) References Cited

U.S. PATENT DOCUMENTS

| | | |
|---|---|---|
| 7,839,901 B2 | 11/2010 | Meleshkevich et al. |
| 8,027,555 B1 | 9/2011 | Kliner et al. |
| 2010/0135339 A1 | 6/2010 | Meleshkevich et al. |
| 2013/0016740 A1* | 1/2013 | Saracco ............ G02B 6/02395 372/6 |
| 2013/0016742 A1* | 1/2013 | Sakamoto .......... G02B 6/02138 372/6 |
| 2013/0308661 A1 | 11/2013 | Nishimura et al. |

FOREIGN PATENT DOCUMENTS

| | | |
|---|---|---|
| JP | 2010-181574 A | 8/2010 |
| JP | 2011-186399 A | 9/2011 |
| WO | 2013001734 A1 | 1/2013 |
| WO | 2013096364 A1 | 6/2013 |

OTHER PUBLICATIONS

Kliner et al., "Fabrication and evaluation of a 500 W cladding-light stripper", SPIE, 2013, pp. 1-8, vol. 8616.
Wetter et al., High power cladding light strippers, SPIE, 2008, pp. 1-8, vol. 6873.
International Search Report (PCT/ISA/210) dated Apr. 29, 2014, by the Canadian Patent Office as the International Searching Authority for International Application No. PCT/CA2013/000704.
The extended European Search Report dated Mar. 15, 2017, by the European Patent Office in corresponding European Patent Application No. 13891126.8-1562. (9 pages).
Office Action (Notification of Reasons for Refusal) dated Jul. 18, 2017, by the Japanese Patent Office in corresponding Japanese Patent Application No. 2016-532167 and an English Translation of the Office Action. (6 pages).

* cited by examiner

SPATIALLY MODULATED CLADDING MODE STRIPPER AND OPTICAL FIBER THEREWITH

TECHNICAL FIELD

The present disclosure relates to the field of optical fiber having a cladding mode stripper, and more particularly to a spatially modulated cladding mode stripper.

BACKGROUND

The ever increasing power of fiber lasers creates a demand for high power handling components. These high-power fiber lasers are based on double-clad optical fiber having an inner rare-earth doped silica core and an inner cladding. This configuration is necessary for pump light coupling and subsequent pump absorption along the length of the double-clad optical fiber. The double-clad optical fiber further comprises an inner cladding with high numerical aperture to couple low brightness pump light. This is achieved by surrounding the inner cladding with an external polymer outer cladding having a refractive index lower than the refractive index of silica. The double-clad optical fiber further comprises an external polymer overcoat having a refractive index higher than the refractive index of silica to provide mechanical integrity. However, currently used polymer overcoats and outer claddings have a relatively low operating temperature range. Because of the limited operating temperature range of known polymer overcoats and outer claddings, high power fiber lasers based on double-clad optical fiber require proper stray light and temperature management, to avoid failure caused by thermal decay of the polymer overcoat.

Frequently, in double-clad optical fiber lasers and amplifiers, undesirable light (such as unabsorbed pump light, light that escapes the double-clad fiber core, or feedback light from material processing) propagates in the inner cladding of the double-clad optical fiber core. This undesirable light, if not stripped out of the double-clad optical fiber, may reduce the output beam quality of the high-power laser or create catastrophic failure of the laser system through thermal decay. The unwanted light is usually stripped by introducing a cladding mode stripper which removes the wave-guiding effect of the inner cladding. An example of prior cladding mode stripper is the typical polymer based cladding mode stripper which replaces the low refractive index polymer outer cladding by a material having a refractive index higher than the refractive index of silica, so that the undesirable light is fully extracted from the inner cladding after a certain length. However, any refractive index value higher than the refractive index of the outer cladding will extract light from the inner cladding by reducing the numerical aperture of the inner cladding waveguide. Techniques aimed at improving power handling capacity of conventional cladding mode strippers are well known in the art. The reliability of cladding mode strippers being related to a peak temperature in the polymer overcoat of the double-clad optical fiber, known techniques attempt to either distribute the heat along the double-clad optical fiber by controlling the rate of light stripping, or reduce the peak temperature by packaging methods.

Wetter et al., in a scientific paper entitled "High power cladding light strippers" (Photonics West 2008, Fiber Lasers V.' Technology, Systems, and Applications, Proc. of SPIE Vol. 6873, 687327), discloses a gradual cladding mode stripper in which the stripping material has a varying refractive index along the double-clad active optical fiber.

Anderegg et al. (in U.S. Pat. No. 7,349,596) discloses a cladding mode stripper applying a stripping material as the outer cladding, said stripping material having a refractive index with negative temperature dependence. By increasing the temperature of the stripping material, the light stripping rate is lowered, and thus the peak temperature in the cladding mode stripper saturates.

Kliner et al. (in U.S. Pat. No. 8,027,555) discloses a cladding mode stripper where the extracted light passes through a block of transparent material to be absorbed.

Finally, Freier et al. (in U.S. Pat. No. 6,301,418) discloses a waveguide light diffuser with non-uniform cladding roughness or indentations.

These different techniques for stripping the undesirable light from a double-clad optical fiber, as disclosed in the aforementioned references, are not easily achieved in practice. Varying the refractive index along the double-clad optical fiber requires a very good spatial resolution of refractive index change. Also, more than one type of polymer with specific low refractive index may be needed, to cover a range of refractive indexes to perform cladding mode stripping. There are fewer choices of materials having a low refractive index with the desired optical and mechanical properties, than materials having a high refractive index. Generally, the operating temperature range of materials having a low refractive index is lower than the operating temperature range of materials having a high refractive index. The same issues also occur for materials having a refractive index with negative temperature dependence. Furthermore, having surface roughness or indentations on a core and inner cladding made of silica reduces its mechanical strength.

Accordingly, there is a need for providing an easier control of undesirable light extraction, to even out the temperature profile within the cladding mode stripper.

SUMMARY

In accordance with an aspect of the invention, the present disclosure relates to a spatially modulated cladding mode stripper for an optical fiber propagating, in operation, a cladding light signal. Said spatially modulated cladding mode stripper comprising a series of alternating light stripping regions and light guiding regions located along a portion of a cladding of the optical fiber.

In accordance with another aspect of the spatially modulated cladding mode stripper, the high cladding light extracting regions comprise a high light stripping material providing high cladding light extraction.

In accordance with another aspect of the spatially modulated cladding mode stripper, the low cladding light extracting regions comprise a low light stripping material providing low cladding light extraction.

In accordance with another aspect of the spatially modulated cladding mode stripper, a length of the high cladding light extracting regions is progressively increased along a direction of propagation of the cladding light signal in the optical fiber.

In accordance with another aspect of the spatially modulated cladding mode stripper, the lengths of the high extracting regions is based on a total cladding light power to extract and a safe temperature limit for operating the cladding mode stripper.

In accordance with another aspect of the spatially modulated cladding mode stripper, a length of the high cladding light extracting regions is fixed while a length of successive low cladding light extracting regions is varied along a direction of propagation of the cladding light signal.

In accordance with another aspect of the spatially modulated cladding mode stripper, the high light stripping material is an optically transparent material having a refractive index higher than a refractive index of the cladding.

In accordance with another aspect of the spatially modulated cladding mode stripper, the high light stripping material has diffusive properties for spreading the extracted cladding light.

In accordance with another aspect of the spatially modulated cladding mode stripper the high light stripping material consists of silica containing optical epoxies.

In accordance with another aspect of the spatially modulated cladding mode stripper, the low cladding light extracting regions comprise an outer cladding surrounding the inner cladding and an overcoat surrounding the outer cladding.

In accordance with another aspect of the spatially modulated cladding mode stripper, the low light stripping material has a refractive index lower than the refractive index of the high light stripping material.

BRIEF DESCRIPTION OF THE DRAWINGS

Embodiments of the disclosure will be described by way of example only with reference to the accompanying drawings, in which.

DETAILED DESCRIPTION

Figure 1A:
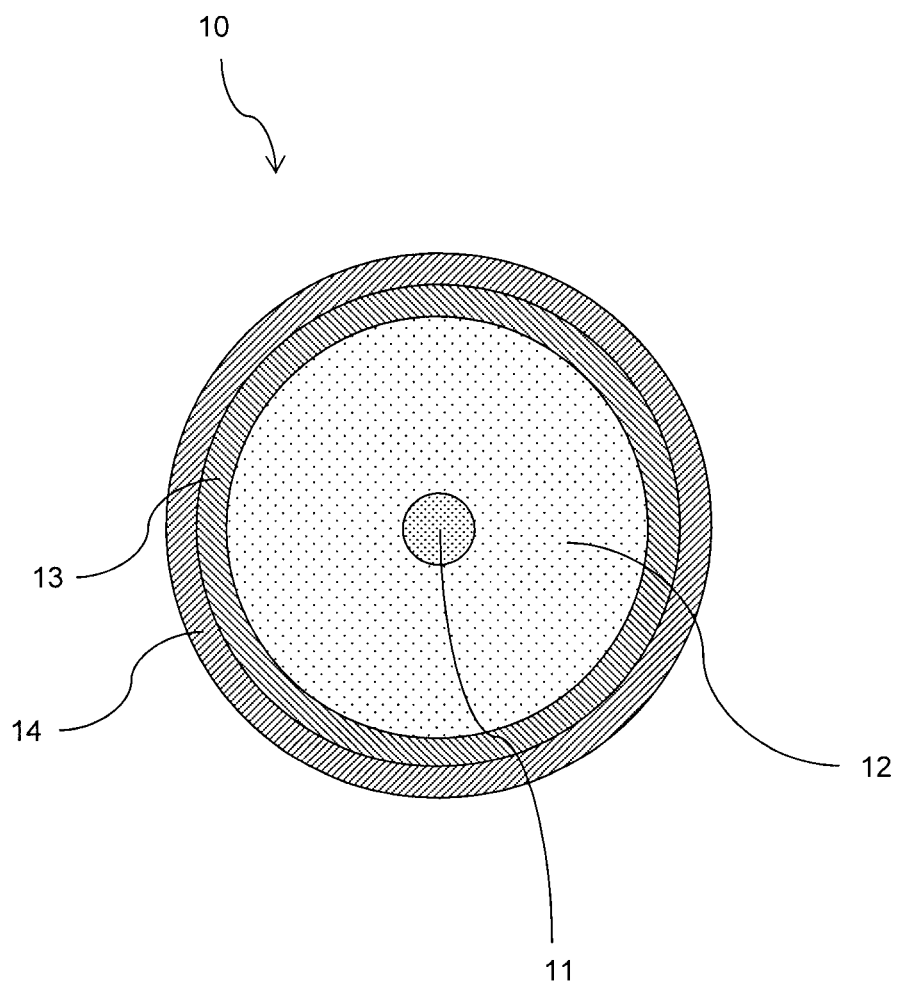
FIG. 1A is a cross-sectional view of a prior art double-clad active optical fiber.

The foregoing and other features will become more apparent upon reading of the following non-restrictive description of illustrative embodiments thereof, given by way of example only with reference to the accompanying drawings. Like numerals represent like features on the various drawings.

The present disclosure relates to a spatially modulated cladding mode stripper, which allows distributed cladding light extraction from an optical fiber. The present spatially modulated cladding mode stripper provides an easier control of the cladding light extraction rate. Furthermore, the present spatially modulated cladding mode stripper allows the evening out of the temperature profile within the cladding mode stripper, which in turn improves power handling capacity of the cladding mode stripper in a manner that does not compromise mechanical integrity of the optical fiber.

Throughout the present disclosure, the expression optical fiber is used to refer to any fiber structure capable of guiding cladding light, such as for example a single-clad optical fiber, a double-clad optical fiber, fiber with or without core, etc.

Although the present description and figures show and describe the present spatially modulated cladding mode stripper with an optical fiber with rare-earth doped silica core, also known in the art as an active double-clad optical fiber, the present spatially modulated cladding mode stripper is not limited to this type of optical fiber. The present invention may be implemented with either an active optical fiber (an optical fiber with rare-earth doped silica core) or passive optical fiber (an optical fiber without a rare-earth doped silica core).

The spatially modulated cladding mode stripper is located along a portion of the length of the optical fiber. The optical fiber may further comprise, for example, on each side of the cladding mode stripper an overcoat having a refractive index higher than the refractive index of its outermost cladding.

The cladding mode stripper comprises a plurality of alternating high cladding light extracting regions and low cladding light extracting regions along a direction of propagation of the cladding light in the cladding of the optic fiber. The high cladding light extracting regions are made of a material providing high cladding light extracting capability, which surrounds the cladding of the optic fiber, to extract cladding light. The low cladding light extracting regions also surround the cladding of the optic fiber, and are made of a low light stripping material providing lower cladding light extracting capability.

The spatial modulation of the cladding mode stripper is achieved by alternating the high cladding light extracting regions and the low cladding light extracting regions along a portion of the optic fiber. Hence, heating due to cladding light extraction is distributed over the alternating high cladding light extracting regions and adjacent low cladding light extracting regions. This represents an improvement over currently known cladding mode strippers having a single continuous high cladding light extracting region, which is more subject to overheating.

The present disclosure also relates to a method of producing the spatially modulated cladding mode stripper along a portion of an exposed cladding of the optical fiber. In a particular embodiment, the method comprises removing at least partially outer cladding(s) and an overcoat of the optical fiber along a portion of the length of the optical fiber, to obtain the exposed cladding.

The method also comprises applying a high light stripping material providing high cladding light extracting capability around the portion of the exposed cladding, to create high cladding light extracting regions surrounding the exposed cladding in the cladding mode stripper region. The method further comprises applying a second material providing low cladding light extracting capability around other regions of the exposed cladding of the optical fiber in the cladding mode stripper region, to create low cladding light extracting regions. The low cladding light extracting regions alternate with the high cladding light extracting regions along a direction of propagation of the cladding light signal in the exposed cladding.

The high light stripping material is a material having a refractive index at least higher than the refractive index of the outer cladding, and must be optically transparent. Those skilled in the art will understand that as the value of refractive index of the high light stripping material increases toward the value of the refractive index of the exposed cladding, the numerical aperture of the exposed cladding will reduce to zero. Thus, the refractive index of the high light stripping material should be higher than the refractive index of the exposed cladding to potentially extract all the cladding light.

In a particular embodiment, the outer cladding(s) and the overcoat are only partially removed along the cladding mode stripper region. In this case, the low cladding light extracting regions are formed by the remaining outer cladding(s) and overcoat, instead of applying a different low light stripping material. However, when the outer cladding(s) and the overcoat are completely removed along the cladding mode stripper region, the low cladding light extracting regions are created by using a low light stripping material different from the outer cladding and overcoat. This low light stripping material has a refractive index lower than the refractive index of the exposed cladding and lower than the refractive index of the high light stripping material.

The respective lengths of the high cladding light extracting regions and low cladding light extracting regions may be varied according to specific heat distribution needs. For example, a specific pattern of high cladding light extracting regions and low cladding light extracting regions may be created and produced to achieve a specific heat distribution pattern along the cladding mode stripper.

Figure 1B:
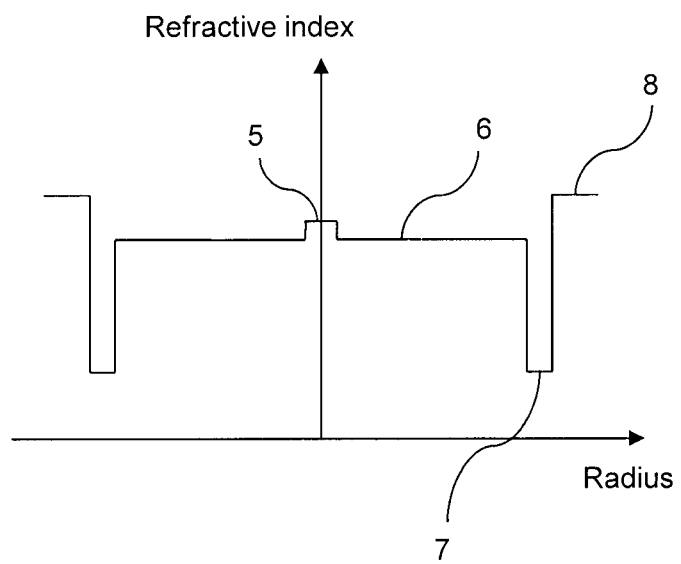
FIG. 1B is a radial profile of a prior art refractive index of the double-clad active optical fiber of FIG. 1A.

Reference is now made to FIGS. 1A and 1B concurrently, which represent respectively a cross-sectional view of a double-clad optical fiber as it is known in the art, and a radial profile of a refractive index of the double-clad optical fiber.

The double-clad optical fiber 10 has an inner rare-earth doped silica core 11 and an inner cladding 12, which is necessary for pump light coupling and subsequent pump absorption along the length of the optical fiber core 11. The inner cladding 12 is usually made of pure silica, and its refractive index 6 is lower than the refractive index 5 of the core 11, to allow guiding of light signal in the core 11. To couple low brightness pump light into the optical fiber 10, the inner cladding 12 has a high numerical aperture. The high numerical aperture of the inner cladding 12 is achieved by surrounding the inner cladding 12 with a low index polymer outer cladding 13 having a refractive index 7 lower than the refractive index 6 of the inner cladding 12 (e.g. lower than the refractive index of silica when the inner cladding 12 is made of pure silica). A high index polymer overcoat 14, having a refractive index 8 higher than the refractive index 6 of the inner cladding 12 (e.g. higher than the refractive index of silica when the inner cladding 12 is made of silica), ensures mechanical and chemical integrity of the optical fiber 10.

Figure 2:
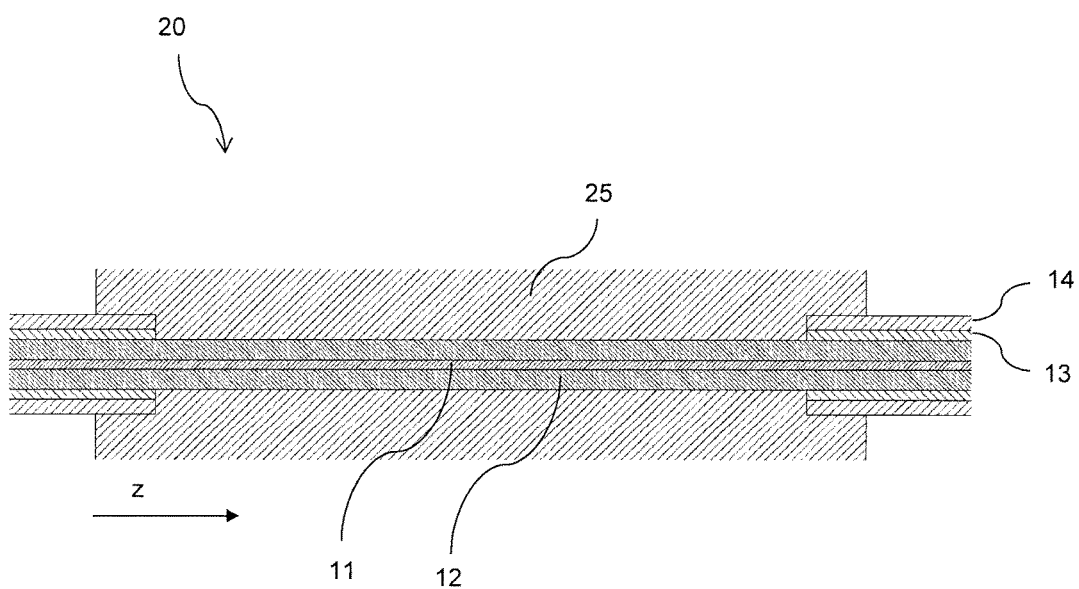
FIG. 2 is a side cross-sectional view of a conventional prior art cladding mode stripper.
Figure 4:
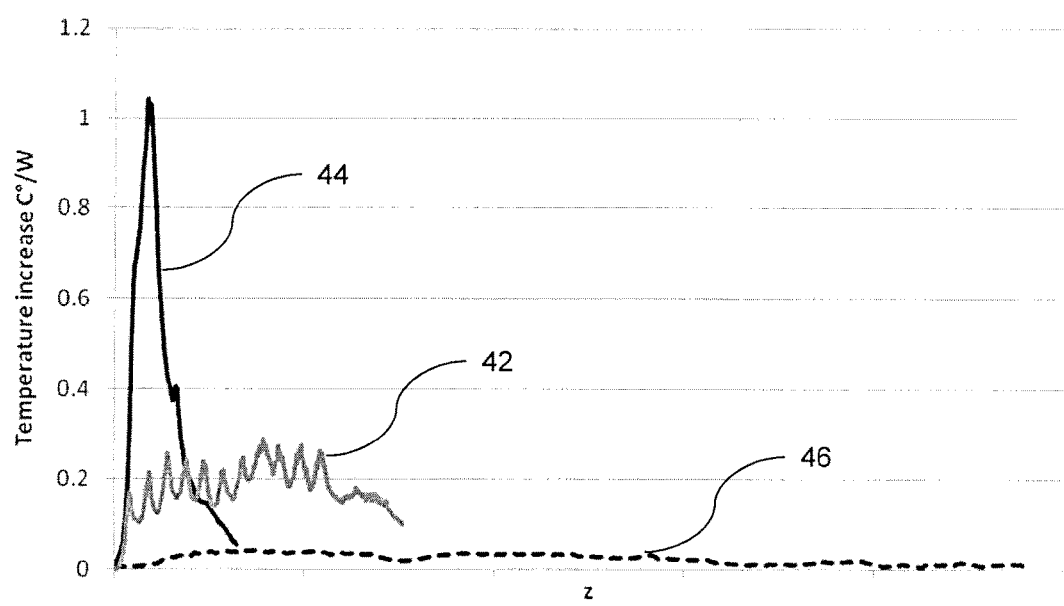
FIG. 4 represents a longitudinal temperature increase profile of several cladding mode strippers.
Figure 5:
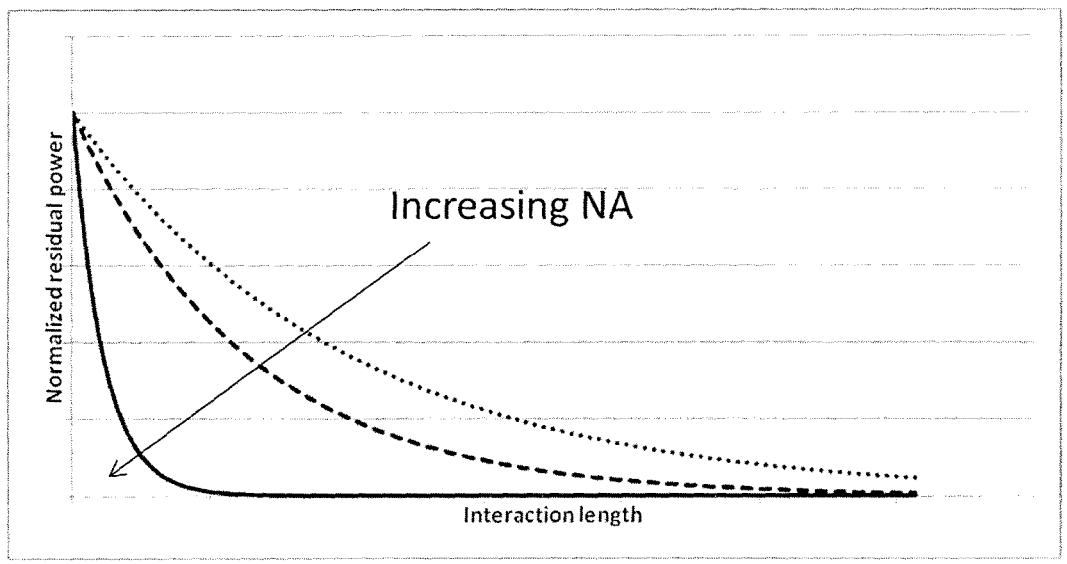
FIG. 5 represents a residual light as a function of an interaction length and an effective light numerical aperture.

Reference is now made to FIG. 2, which represents a side cross-sectional view of a conventional cladding mode stripper 20, as known in the art. In conventional cladding mode stripper 20, cladding light extraction from the inner cladding 12 is achieved by altering the waveguide function of the outer cladding 13. In the conventional cladding mode stripper 20 represented in FIG. 2, the outer cladding 13 and the overcoat 14 are removed along a certain length of the optical fiber, and replaced by a stripping material 25. The stripping material 25 is an optically transparent material having a refractive index equal to or higher than the refractive index of the inner cladding 12. Such optically transparent materials include for example optically clear epoxies or polymers. Thus, light signal propagating in the core 11 of the fiber is guided, while the cladding light in the inner cladding 12 exits on a relatively short propagation length. Furthermore, rays having a larger propagating angle are extracted first, as illustrated by the graphical results of normalized residual power versus length of the conventional mode stripper in FIG. 5. Heating of the stripping material 25 is proportional to the light absorption rate of the light stripping material 25 and to the cladding light power propagating there into. Thus, in a typical cladding mode stripper 20, the extracted cladding light power density and temperature are maximal at some point in the cladding mode stripper 20, as illustrated in FIG. 4, where the temperature distribution curve 44 corresponds to a conventional cladding mode stripper 20 as discussed above.

Figure 3:
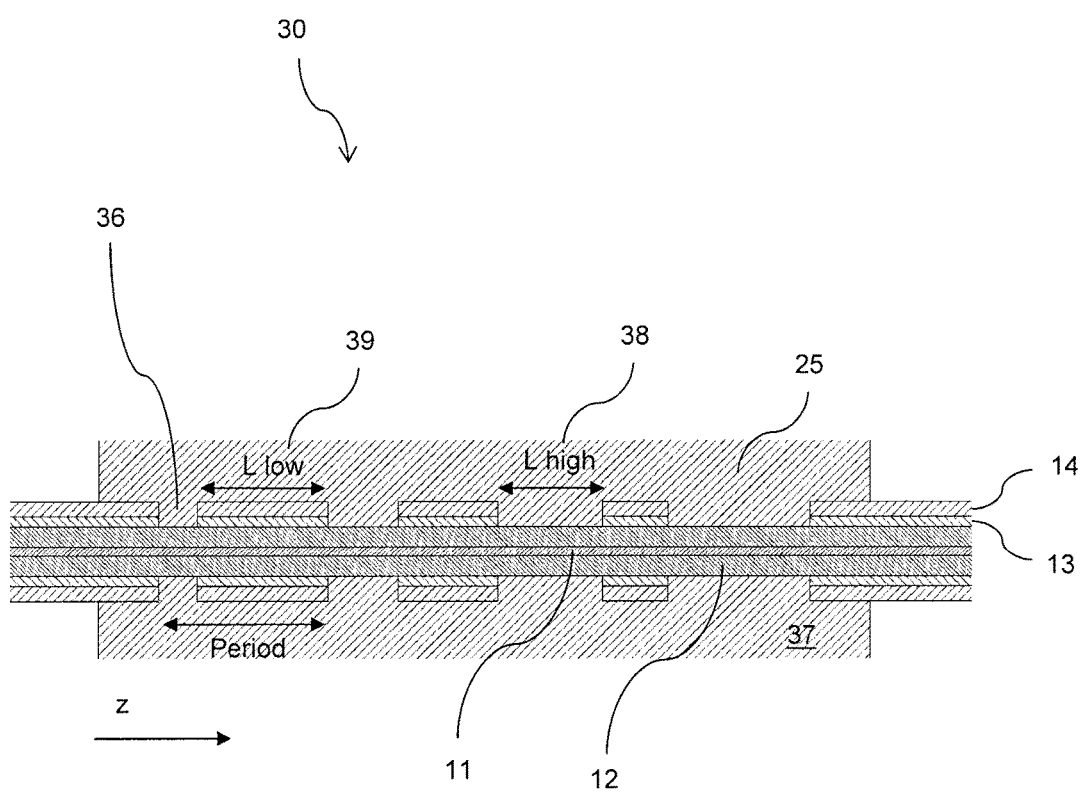
FIG. 3 is a side cross-sectional view of a spatially modulated cladding mode stripper where lengths of light guiding regions and light stripping regions are varied, according to a non-restrictive illustrative embodiment.

Reference is now made to FIG. 3, which represents a side cross-sectional view of the present spatially modulated cladding mode stripper on a double-clad optical fiber, where lengths of light guiding regions and light stripping regions are alternated and varied, according to an embodiment of the present disclosure. The double-clad optical fiber is used as an example only, and the present spatially modulated cladding mode stripper and related method should not be construed to be limited to double-clad optical fibers.

As the optical fiber is a double-clad optical fiber, a cladding mode stripping region 37 is first provided by removing a series of small sections of the outer cladding 13 and overcoat 14 to provide the exposed cladding, i.e. the inner cladding in the present instance. Gaps 36 generated by the removal of the small sections of the outer cladding 13 and overcoat 14 are filled with a light stripping material 25. The alternating gaps 36 and remaining outer cladding 13 and overcoat 14 create a pattern of alternating light stripping regions 38 and light guiding regions 39 along the core 11. Further, lengths of the light stripping regions 38 and light guiding regions 39 may be identical, of different sizes, or varied along the length of the cladding mode stripping region 37. Each light stripping region 38 strips (i.e. extracts) cladding light from the exposed cladding 12, extracted light which spreads over a certain length of the light guiding region through the cladding mode stripper 30. The stripping material 25 may have diffusive properties, such as for example fumed silica containing optical epoxies, to contribute to spreading the extracted light and preventing heat build up along the cladding mode stripper 30. Use of a light stripping material with diffusive properties is especially important for cladding light rays having a low numerical aperture.

In order to reduce the overall length of the cladding mode stripper 30, the length of the light stripping regions 38 is progressively increased, so that a thermal profile is flattened along the cladding mode stripper 30, as the light extraction rate diminishes through the cladding mode stripper 30, since less and less cladding light is present to be extracted. Having knowledge of a total cladding light power to extract, of the numerical aperture distribution of the cladding light to be extracted, and of a safe temperature limit of the cladding mode stripper 30, a precise modulation pattern of the cladding light extraction can be designed.

Reference is now made concurrently to FIGS. 3 and 4, where FIG. 4 represents a longitudinal temperature profile of different cladding mode strippers. A longitudinal temperature profile 42 corresponds to the spatially modulated cladding mode stripper 30 illustrated in FIG. 3. It can be compared to a longitudinal temperature profile 44, of the conventional cladding mode stripper 20 illustrated in FIG. 2. The cladding mode strippers, for which the longitudinal temperature increase profiles 42 and 44 are represented in FIG. 4, were tested in similar conditions and performed with similar techniques.

A minimal controllable length of the light stripping region 38 and a total length of the cladding mode stripper 30 constitute two design constraints of the cladding mode stripper 30. However, optical fibers are by nature very long and thus the overall length is generally not a concern. On the other hand, gaps 36 as short as a few tens of microns can be created in the outer cladding(s) 13 to insure minimal cladding light extraction. The improvement on the temperature profile 42 of the spatially modulated cladding mode stripper 30 (illustrated in FIG. 3) over the temperature profile 44 of the conventional cladding mode stripper 20 (illustrated in FIG. 2) corresponds at least roughly to the ratio of the length of the shortest light stripping region 38 and the length of the adjacent light guiding region 39. This approximation of the improvement of the temperature profile is valid for a light guiding region 39 shorter than a few millimeters. With a long enough cladding mode stripper 30, kilowatts level power extraction is possible, as illustrated with the temperature profile 46 represented in FIG. 4. However, the maximum extracting power of the cladding mode stripper 30 is affected by the cladding light numerical aperture, i.e. in the instance of FIG. 3, the cladding light in the internal cladding. Extracting higher numerical aperture rays requires a shorter first light stripping region 38, because of the increased interaction level of the cladding light with the stripping material 25. Thus at some point, controlling the length of the first light stripping region 38 may become increasingly important.

Figure 6:
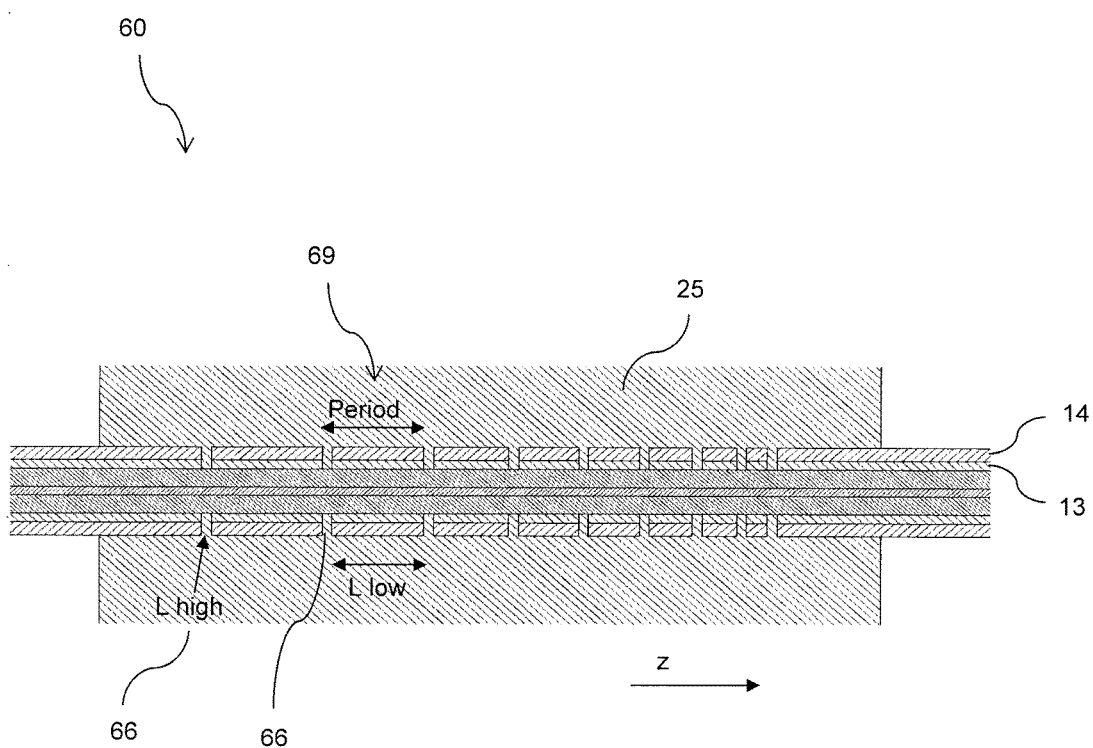
FIG. 6 is a side cross sectional view of a spatially modulated cladding mode stripper where a period is varied.

Referring now to FIG. 6, another embodiment of a spatially modulated cladding mode stripper 60 is represented. In this embodiment, the spatially modulated cladding mode stripper 60 is created by creating a series of gaps along the cladding mode stripper region. The gaps are created by exposing the inner cladding, and for doing so in the particular example of FIG. 6, by removing the outer cladding and the overcoat. The gaps correspond to light stripping regions 66 of fixed but very short length. The gaps alternate with a series of light guiding regions 69 of varied lengths, which correspond to the untouched optical fiber with remaining outer cladding and overcoat. The light stripping regions 66 are realized by filling the gaps with the stripping material 25.

Figure 7:
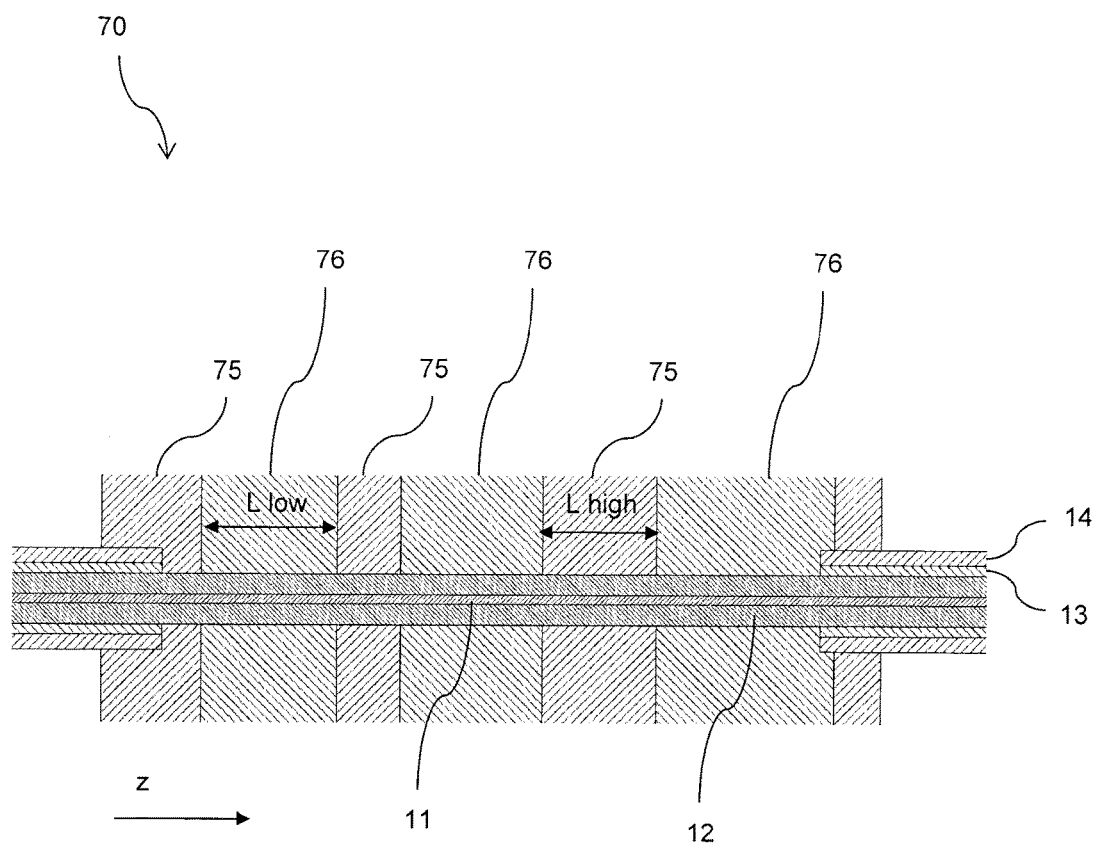
FIG. 7 is a side cross sectional view of a spatially modulated cladding mode stripper, according to still another non-restrictive illustrative embodiment.

Referring now to FIG. 7, still another embodiment of a spatially modulated cladding mode stripper is represented. In the spatially modulated cladding mode stripper 70, the inner cladding is exposed along the entire cladding mode stripper region. The inner cladding is exposed (and hereinafter referred to as the exposed cladding) by removing the outer cladding 13 and the overcoat 14 over the length of the cladding mode stripper 70. Furthermore, high cladding light extraction regions 75 and low cladding light extracting regions 76 are realized by applying a pattern of materials with different refractive indexes around the exposed cladding along the length of the cladding mode stripper region. Cladding light propagating in the exposed cladding 12 is extracted by the cladding mode stripper 70, in a series of alternating high and low cladding light extracting regions, while the light signal propagating in the core 11 remains intact.

Figure 8:
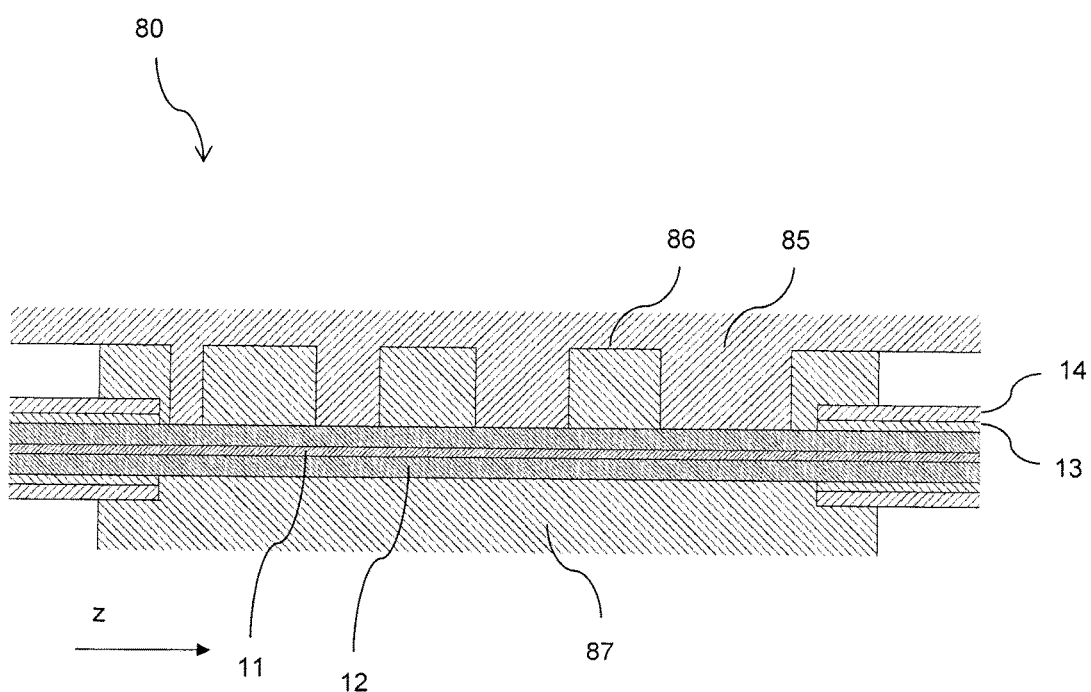
FIG. 8 is a side cross sectional view of a spatially modulated cladding mode stripper, according to yet another non-restrictive illustrative embodiment.

Referring now to FIG. 8, yet another embodiment of the present spatially modulated cladding mode stripper 80 is represented. In this embodiment of the spatially modulated cladding mode stripper 80, as in the embodiment of FIG. 7, the inner cladding is exposed (and afterwards referred to as the exposed cladding) by removing the outer cladding 13 and the overcoat 14 over the length of the cladding mode stripper 80. Furthermore, the exposed cladding 12 is surrounded over the length of the cladding mode stripper region with a solid material 85 (such as glass, metal, polymers) having a pattern of indentations 86. The solid material 85 may act either as a high cladding light extracting region or a low cladding light extraction region. The indentations 86 are filled with a material with either a low or a high refractive index (such as gas, liquid, polymer and metal). The exposed cladding 12 is also in contact with an inactive region 87, where the solid material 85 is not present. The inactive region 87 is made from a material with a low refractive index such as water, or a polymer.

Although FIGS. 3, 6, 7 and 8 depict the present embodiments of the spatially modulated cladding mode stripper on a doubleclad optical fiber, the present spatially modulated cladding mode stripper is not limited to use with such optical fiber. The present spatially modulated cladding mode stripper may be used on any type of optical fiber, on which cladding light is to be removed. The cladding light may be removed from any layer of cladding, by simply exposing the layer of cladding from which cladding light must be extracted, as previously described, hence use of the terminology exposed cladding.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A spatially modulated cladding mode stripper comprising an optical fiber having an inner cladding of a first material, and an outer cladding of a second material different from the first material, the outer cladding having a plurality of gaps positioned between light guiding regions of the second material and along a length of the inner cladding, the light guiding regions of the second material surrounding the inner cladding, and a plurality of light stripping regions coinciding with the location of the gaps, the light stripping regions comprising light stripping material filling the plurality of gaps and covering the inner cladding, the light stripping material being different from the second material, and forming a series of light stripping regions alternating with the light guiding regions along a portion of the inner cladding.

2. The spatially modulated cladding mode stripper of claim 1, wherein lengths of the light stripping regions are progressively increased along a direction of propagation of the light in the inner cladding.

3. The spatially modulated cladding mode stripper of claim 2, wherein the lengths of the light stripping regions are based on a total cladding light power to strip and a safe temperature limit for operating the cladding mode stripper.

4. The spatially modulated cladding mode stripper of claim 1, wherein lengths of the light stripping regions are fixed while lengths of successive light guiding regions are decreased along a direction of propagation of the light in the inner cladding.

5. The spatially modulated cladding mode stripper of claim 1, wherein the light stripping material is an optically transparent material having a refractive index higher than a refractive index of the inner cladding.

6. The spatially modulated cladding mode stripper of claim 1, wherein the light stripping material is an optically transparent material having a refractive index higher than a refractive index of the outer cladding of the optical fiber.

7. The spatially modulated cladding mode stripper of claim 1, wherein the light stripping material has diffusive properties for spreading stripped cladding light.

8. The spatially modulated cladding mode stripper of claim 1, wherein the light stripping material comprises silica containing optical epoxies.

9. The spatially modulated cladding mode stripper of claim 1, wherein the light guiding regions comprise an overcoat surrounding the outer cladding.

10. A method of producing a spatially modulated cladding mode stripper along a length of an optical fiber having an inner cladding of a first material and an outer cladding of a second material different from the first material, the method comprising the steps of:

forming a plurality of gaps in the outer cladding by partially removing the outer cladding of the optical fiber at a plurality of spaced portions along the length of the inner cladding, while leaving a plurality of light guiding regions having the second material surrounding the inner cladding; and filling the gaps with light stripping material covering the inner cladding of the optical fiber.

11. The method of claim 10, wherein said removing the outer cladding further comprises removing an overcoat surrounding the outer cladding.

12. The method of claim 10, wherein lengths of the gaps are progressively increased along a direction of propagation of the light in the inner cladding.

13. The method of claim 10, wherein lengths of the gaps are fixed while lengths of remaining portions of the outer cladding are decreased along a direction of propagation of the light in the inner cladding.

\* \* \* \* \*